US 8,396,986 B2

(12) United States Patent
Kanada et al.

(10) Patent No.: US 8,396,986 B2
(45) Date of Patent: Mar. 12, 2013

(54) METHOD AND SYSTEM OF VIRTUAL MACHINE MIGRATION

(75) Inventors: Yasusi Kanada, Tokyo (JP); Yasushi Kasugai, Ninomiya (JP); Shinji Suzuki, Yokohama (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 13/023,908

(22) Filed: Feb. 9, 2011

(65) Prior Publication Data

US 2011/0246669 A1    Oct. 6, 2011

(30) Foreign Application Priority Data

Mar. 30, 2010    (JP) .................................. 2010-077436

(51) Int. Cl.
*G06F 15/173* (2006.01)
(52) U.S. Cl. ............. 709/238; 717/138; 714/4.1; 718/1; 711/163
(58) Field of Classification Search .................... 709/238
See application file for complete search history.

(56) References Cited

U.S. PATENT DOCUMENTS

| | | | |
|---|---|---|---|
| 2007/0180436 A1* | 8/2007 | Travostino et al. | 717/138 |
| 2009/0037607 A1 | 2/2009 | Farinacci et al. | |
| 2009/0106409 A1 | 4/2009 | Murata | |
| 2009/0138752 A1* | 5/2009 | Graham et al. | 714/4 |
| 2010/0306408 A1* | 12/2010 | Greenberg et al. | 709/238 |
| 2011/0004878 A1* | 1/2011 | Divoux | 718/1 |
| 2011/0022812 A1* | 1/2011 | van der Linden et al. | 711/163 |

FOREIGN PATENT DOCUMENTS

| | | |
|---|---|---|
| JP | 2008-217302 A | 9/2008 |
| JP | 2009-5189 A | 1/2009 |
| JP | 2009-116852 A | 5/2009 |

OTHER PUBLICATIONS

Haikun Liu, Hai Jin, Xiaofei Liao, Liting Hu, ChenYu, "Live Migration of Virtual Machine Based on Full System Trace and Replay", Jun. 2009, HPDC'09, ACM, pp. 101-110, http://cse.unl.edu/~bmao/Virtual%20Machine/Live%20Migration%20of%20Virtual%20Machine%20Based%20on%20Full%20System-- HPDC'09.pdf.*
Christopher Clark, Keir Fraser, Steven Hand, Jacob Gorm Hansen, Eric Jul, Christian Limpach, Ian Pratt, Andrew Warfield, "Live Migration of Virtual Machines", May 2005, USENIX Association, NSDI'05 2nd Symposium on Networked Systems Design and Implementation, pp. 273-286.* C. Clark et al., Live Migration of Virtual Machines, NSDI '05: 2nd Symposium on Networked Systems Design & Implementation, pp. 273-286, 2005.
M. Nelson et al., Fast Transparent Migration for Virtual Machines, 2005 USENIX Annual Technical Conference, Article 25, pp. 391-394, 2005.
Q. Li et al., HyperMIP: Hypervisor controlled Mobile IP for Virtual Machine Live Migration across Networks, 11th IEEE High Assurance Systems Engineering Symposium, pp. 80-88, 2008.

* cited by examiner

*Primary Examiner* — Hua Fan
(74) *Attorney, Agent, or Firm* — Mattingly & Malur, PC

(57) ABSTRACT

In cooperation between each data center and a WAN, virtual machine migration is carried out without interruption in processing so as to enable effective power-saving implementation, load distribution, or fault countermeasure processing. Each node located at a boundary point between the WAN and another network is provided with a network address translation (NAT) function that can be set dynamically to avoid address duplication due to virtual machine migration. Alternatively, each node included in the WAN is provided with a network virtualization function; and there are implemented a virtual network connected to a data center for including a virtual machine before migration, and a virtual network connected to a data center for including the virtual machine after migration, thereby allowing coexistent provision of identical addresses. Thus, the need for changing network routing information at the time of virtual machine migration can be eliminated, and a setting change for migration accomplished quickly.

18 Claims, 10 Drawing Sheets

METHOD AND SYSTEM OF VIRTUAL MACHINE MIGRATION

CLAIM OF PRIORITY

The present application claims priority from Japanese patent application JP2010-077436 filed on Mar. 30, 2010, the content of which is hereby incorporated by reference into this application.

BACKGROUND OF THE INVENTION

The present invention relates to a technique for live migration of virtual machines among servers located at different network points.

As the amount of communication traffic on the Internet has been increasing, the amount of power consumption in terms of entire networking has also been growing continuously. Meanwhile, the significance of power saving is becoming higher in the efforts of solving the global warming issue including suppression of carbon dioxide emissions. Although a certain level of power saving has been accomplished in individual data centers and network nodes by using conventional techniques, it is of critical importance at present that each data center and a wide area network (WAN) should be arranged to work cooperatively for achieving more effective power saving. One of the reasons is that the removal of all the loads of particular communication traffic flowing between a data center and users or other servers makes it allowable to shut down power to relevant devices of the data center and network nodes associated therewith that are provided for the particular communication traffic.

As a conventional technique for reducing power consumption in server operation, there is known a method wherein, when the rate of server utilization has decreased, processing operations distributed among plural servers are collectively shifted to a particular one or particular ones of the servers, and the remaining servers thus freed from loads are powered off. For collective shifting of processing operations in such a case as mentioned above, it is common practice to virtualize the servers so that normal processing operations are performed on virtual machines (VMs). Then, in units of VMs, server-to-server migration thereof (movement/transfer) is carried out whenever appropriate. Migration of a VM being active in processing from the current server thereof to another server is referred to as live migration. Server virtualization techniques such as Xen and VMware (registered trademarks) are available at present. A live migration technique regarding the Xen is described in Non-patent Document 1 indicated below, and a live migration technique regarding the VMware, i.e., a technique of VMotion is described in Non-patent Document 2 indicated below.

In live migration, it is required to prevent the occurrence of an adverse effect such as an interruption of communication or a delay of response in each application running on the VM concerned. On each server in a data center, there are carried out various applications including realtime applications such as online games and conference systems. To circumvent an adverse effect on these realtime applications, it is necessary to minimize a downtime, i.e., a period of time the execution of applications is suspended during migration. In the Non-patent Document 1, it has been reported that a VM being active in running an online game named Quake 3 was successfully migrated with a total downtime of 60 ms, thus providing effectively seamless migration from a user's point of view.

In Patent Document 1 indicated below, there is disclosed a technique for shortening a period of time from the moment when a VM before migration is stopped until the moment when the VM after migration is started in the case of live migration on a LAN.

In Non-patent Document 3 indicated below, there is described a method for implementing VM migration over a wide area. In accordance with the method described in the Non-patent Document 3, even in cases where a VM is migrated to any location on an IP network, communication can be continued by using Mobile IP. Further, Patent Document 2 indicated below discloses a method wherein distant data centers are connected through a Level-2 (L2) path based on encapsulation using the Internet Protocol, thereby enabling such an operation as live migration.

RELATED ART REFERENCES

Non-Patent Documents

Non-Patent Document 1:
Clark, C., Fraser, K., Hand, S., Gorm Hansen, J., Jul, E., Limpach, C., Pratt, I., and Warfield, A., "Live Migration of Virtual Machines", 2nd Symposium on Networked Systems Design and Implementation (NSDI '05), pp. 273-286, 2005.
Non-Patent Document 2:
Nelson, M., Lim, B.-H., and Hutchins, G., "Fast Transparent Migration for Virtual Machines", 2005 USENIX Annual Technical Conference, Article 25, 2005.
Non-Patent Document 3:
Qin Li, Jinpeng Huai, Jianxin Li, Tianyu Wo, and Minxiong Wen, "HyperMIP: Hypervisor Controlled Mobile IP for Virtual Machine Live Migration across Networks", 11th IEEE High Assurance Systems Engineering Symposium, pp. 80-88, 2008.

Patent Documents

Patent Document 1:
Japanese Patent Application Laid-Open Publication No. 2008-217302
Patent Document 2:
U.S. Patent Application Publication No. US 20090037607

BRIEF SUMMARY OF THE INVENTION

The techniques described in the Patent Document 1 and the Non-Patent Document 2 are, however, intended for migrating a VM between two servers residing in a LAN. It is not possible to apply these techniques directly to actual practice of VM migration between servers that are located distributively in a wide area, i.e., the implementation of power saving in cooperation between each data center and network is not feasible with these techniques.

Further, regarding the technique described in the Non-patent Document 3, it is disclosed that a downtime in VM migration will be on the order of tens of seconds.

In the method described in the Patent Document 2, data centers are connected through an encapsulated Ethernet path (registered trademark), and communications from users can also be routed through the encapsulated Ethernet path. Hence, although not mentioned in the Patent Document 2, it is presumable that a reduction in downtime will be provided. However, the method described in the Patent Document 2 is disadvantageous in that the flows of communication traffic tend to concentrate on a path to a particular data center even in cases where data centers are located distributively.

It is therefore an object of the present invention to enable, in cooperation between each data center and a WAN, the implementation of power saving that is more effective than conventional power saving limited within the confines of an individual data center or an individual network. For this purpose, it is required to provide a technique wherein all the applications concerned running in a state of distributed processing operations and traffic flows are migrated to a server of another data center, and wherein the flows of traffic concerned are also migrated to another network node. In particular, to carry out migration without adversely affecting realtime application operations, an application downtime should be minimized, preferably be decreased to the order of tens of ms or less.

A second object of the present invention is to enable, in cooperation between each data center and a WAN, the implementation of wide-area load distribution that is more effective than conventional load distribution limited within the confines of an individual data center. In particular, where processing operations are distributed to plural data centers, traffic flows in the WAN concerned should also be distributed properly. For such load distribution, it is effective to use a technique for migrating applications to a server of another data center. Hence, a technique similar to that mentioned above for power-saving implementation is required.

A third object of the present invention is to make it possible to minimize, in cooperation between each data center and a WAN, the degree of adverse effect due to occurrence of a fault-inducing event such as excessive traffic congestion that may be brought about by emergency information regarding earthquake prediction or hostile aerial intrusion, for example, in an area where the data center concerned is located. In fault countermeasure processing against such a fault-inducing event, it is effective to use a technique for migrating applications and traffic flows to a server of another data center. Hence, a technique similar to that mentioned above for power-saving implementation is required.

In order to address the disadvantages of the conventional techniques mentioned above, the present invention is intended to provide a method of virtual machine migration and a system thereof wherein programs and virtual machines can be migrated within a short period of time over a wide area, thereby enabling migration of any applications along with communication traffic flows associated therewith.

In accomplishing the above-mentioned objects of the present invention and according to one aspect thereof, there is provided a method of virtual machine migration in a network configuration in which a first LAN is connected to a first node located on a first network for routing packet in accordance with routing information, in which a second LAN is connected to a second node located on the first network, and in which a second network is connected to a third node located on the first network. The method of virtual machine migration includes the steps of: under a condition where communication between a virtual machine running on a first server connected to the first LAN and a client terminal connected to the second network is made through the first node and the third node, migrating the virtual machine to a second server connected to the second LAN without changing an address thereof on the first network and a MAC (Media Access Control) address thereof; performing a setting change in the third node in synchronization with migration of the virtual machine; changing a route for the communication between the virtual machine and the client terminal so that the communication therebetween is made through the second node and the third node in accordance with routing information of the first network; and allowing the client terminal to continue communicating with the virtual machine that has been migrated to the second server.

Further, according to another aspect of the present invention, there is provided a system of virtual machine migration in a network configuration in which a first network includes first, second, and third nodes for routing packets in accordance with routing information, and in which third, fourth, and second networks are connected to the first, second, and third nodes, respectively. In the system of virtual machine migration, under a condition where communication between a virtual machine running on a first server and a client terminal connected to the second network is made through the first node and the third node, the virtual machine is migrated to a second server connected to the fourth network without changing an address thereof on the first network and a MAC address thereof; a setting change in the third node is performed in synchronization with migration of the virtual machine to change a route for the communication between the virtual machine and the client terminal so that the communication therebetween is made through the second node and the third node in accordance with routing information of the first network; and the client terminal is allowed to continue communicating with the virtual machine that has been migrated to the second server.

More specifically, for accomplishing the above-mentioned objects of the present invention, the following two kinds of sets of arrangements are provided according to preferable aspects of the present invention.

In a first means, each node located at a boundary point between a WAN corresponding to a first network and another network is provided with a network address translation (NAT) function or mechanism that can be set dynamically. A first NAT function of a network node connected to a data center corresponding to the source of VM migration concerned is set so as to carry out the following operations: When an address of the VM concerned is contained as a transmission source address in a packet arriving at the node from the data center corresponding to the source of VM migration, a translation into a second address is performed with avoidance of address duplication. Contrastingly, when the second address is contained as a transmission destination address in a packet being transferred from the node to the data center corresponding to the source of VM migration, a translation into the VM address is performed. Further, a second NAT function of a network node connected to the VM user is set so as to carry out the following operations: In a case where the VM resides in the data center corresponding to the source of VM migration, when a second address is contained as a transmission source address in a packet being transferred from the node to a network of the user, a translation into an address of the VM is performed. Contrastingly, when the VM address is contained as a transmission destination address in a packet arriving at the node from the network of the user, a translation to the second address is performed. Then, on completion of migration of the VM to a data center corresponding to the destination of migration, the setting of the second NAT function is nullified. Thus, in the WAN, no address duplication takes place between a packet from the data center corresponding to the source of VM migration and a packet from the data center corresponding to the destination of VM migration.

In a second means, each network node included in the WAN is provided with a network virtualization function; and there are implemented a virtual network connected to a data center for including a VM before migration, and a second virtual network connected to a data center for including the VM after migration. The setting is made so as to carry out the following operations: In a case where the VM resides in the data center corresponding to the source of VM migration, when an address of the VM is contained as a transmission source address in a packet arriving at each entry/exit point the WAN, the packet is transferred to the first virtual network. Further, after detection of migration of the VM to the data center corresponding to the destination of migration, when the VM address is contained as a transmission source address in a packet arriving at each entry/exit point of the WAN, the packet is transferred to the second virtual network.

By applying the first or second means mentioned above, the need for changing network routing information at the time of VM migration can be eliminated, thus resulting in no time being allowed for the system to become unstable. Further, upon detection of VM migration, a state of communication with the VM before migration is changed over to a state of communication with the VM after migration. Hence, it is possible to decrease a downtime to the order of tens of ms or less. For access to the VM, an address assigned thereto before migration can be used intact.

As described above and according to the present invention, it is possible to decrease a downtime in live migration over a wide area network. Hence, VMs that are active in running various applications can be migrated over a wide area. Consequently, the present invention provides the advantageous effects of enabling the implementation of power saving mentioned as the first object thereof, the implementation of load distribution mentioned as the second object thereof, and the implementation of fault countermeasure processing mentioned as the third object thereof.

DETAILED DESCRIPTION OF THE INVENTION

The present invention will now be described in detail by way of example with reference to the accompanying drawings. The term "virtual machine" (VM) as used herein denotes an object including a program to be executed by a computer user and data for execution thereof. For example, a process that handles a particular program and data belongs to the category of virtual machines (VM). The term "migration" is herein also referred to as "transfer" or "movement" wherever appropriate.

First Preferred Embodiment

Figure 1:
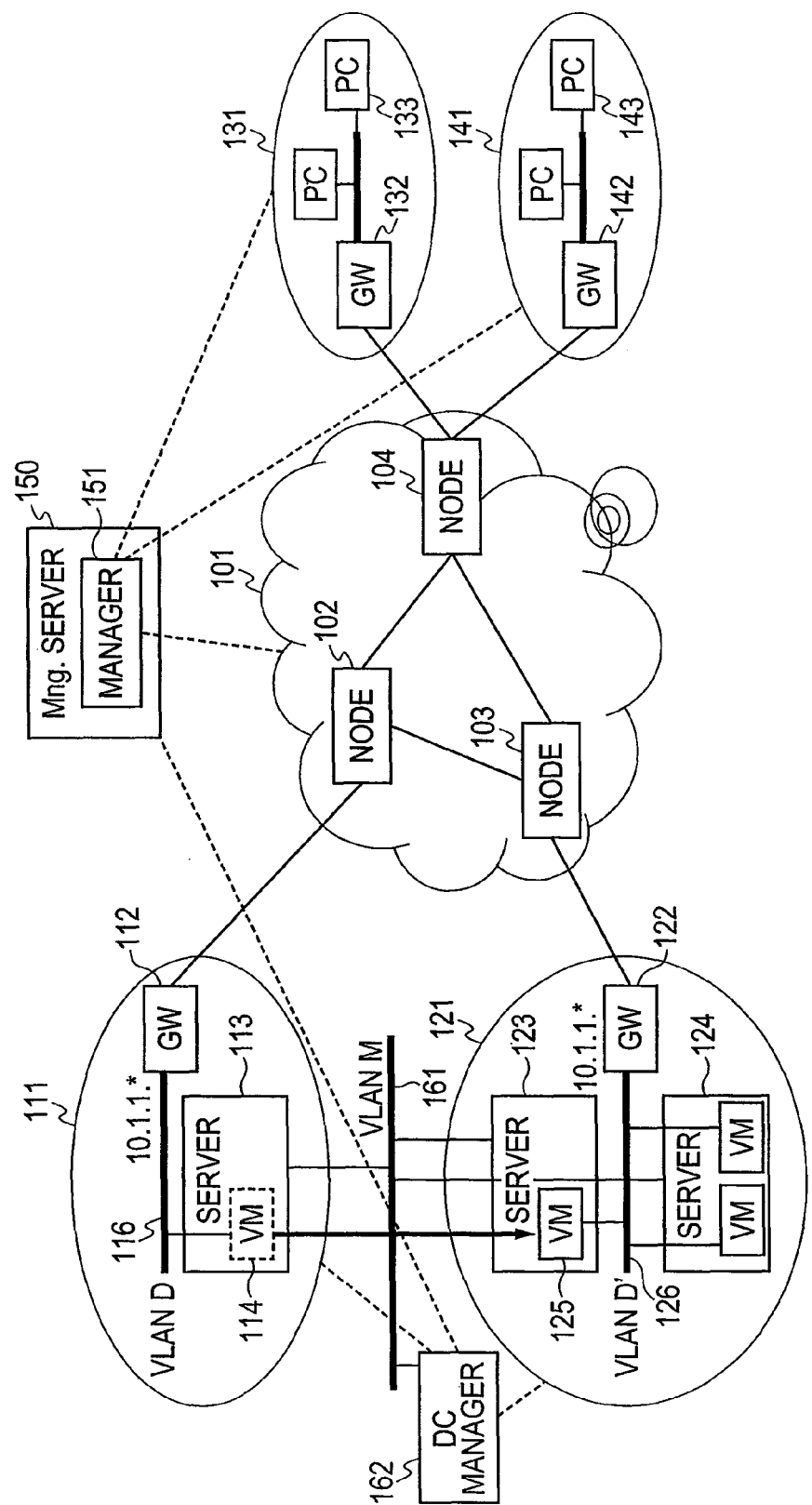
FIG. 1 is a physical configuration diagram of a network according to first and second preferred embodiments of the present invention.

FIG. 1 is a physical configuration diagram of a network in exemplary implementation common to first and second preferred embodiments of the present invention.

As shown in FIG. 1, a first central network WAN 101 includes an edge node 102 connected to a data center 111, an edge node 103 connected to a data center 121, and an edge node 104 connected to user networks 131 and 141 configuring a second network. The WAN 101 may include more network nodes, and plural network nodes may be connected to different user networks. In the first preferred embodiment of the present invention, the edge nodes 102, 103, and 104 are routers each having a function for network address translation (NAT). In the second preferred embodiment to be described later, the edge nodes 102, 103, and 104 are level-3 (L3) switches each having a function for network virtualization.

In the WAN 101, the edge nodes thereof may be interconnected via a core node instead of direct interconnection therebetween. Further, the user networks 131 and 141 configuring the second network may be connected to different edge nodes respectively instead of being connected to the same edge node 104. In cases where there are provided plural edge nodes connected to plural user networks respectively, similar processing is carried out at each edge node.

In the data center 111, there is provided a gateway 112 connected to the edge node 102, and a first server 113 is connected to a VLAN D 116 having connection to the gateway 112. Other servers may also be connected to the VLAN D 116. As shown in FIG. 1, an IP subnet address of 10.1.1.* is assigned to the VLAN D 116 used as a first LAN. The server 113 includes a virtual machine (VM) 114. The gateway 112 is arranged to work as a switch or a router. Where the gateway 112 is arranged to work as a router, an IP address of a LAN-side port thereof is assigned as a default gateway address for access from the server 113 in the data center 111 to the WAN 101. Alternatively, where the gateway 112 is arranged to work as an L2 switch, an IP address of a gateway-side port of the edge node 102 is assigned as a default gateway address for access from the server 113 in the data center 111 to the WAN 101.

Likewise, in the data center 121, there is provided a gateway 122 connected to the edge node 103. A second server 123 and another server 124 are connected to a VLAN D' 126 (used as a second LAN) having connection to the gateway 122.

Other servers may also be connected to the VLAN D' 126. To the VLAN D' 126, there is assigned an IP subnet address of 10.1.1.* which is identical to the IP subnet address of the first LAN in the data center 111.

On the VLAN D' 126 used as the second LAN, it is necessary to provide a MAC address identical to that on the VLAN D 116 used as the first LAN. Hence, no direct Ethernet connection to the VLAN D 116 is set up. However, for VM-to-VM communication between the data centers 111 and 121 according to Ethernet protocols in cases where some VMs have been migrated, there is provided a kind of gateway that allows passage of only the Ethernet packets having a particular MAC address. Thus, the VLAN D 116 and the VLAN D' 126 can be connected through such a gateway.

The first and second LANs mentioned above are herein also referred to as "third and fourth networks" wherever appropriate for the sake of convenience in distinction from the WAN 101 arranged as the first network and the user networks 131 and 141 arranged as the second network.

In the network configuration shown in FIG. 1, a VM 125 is indicated as a member included in the server 123. It is to be noted that the VM 125 is a destination virtual machine in migration of the VM 114 included in the server 113, i.e., the VM 125 does not coexist with the VM 114 in the server 113 during normal operation. Where the gateway 122 is arranged to work as a router, an IP address of a LAN-side port thereof is assigned as a default gateway address for access from a server in the data center 121 to the WAN 101. Alternatively, where the gateway 122 is arranged to work as an L2 switch, an IP address of a gateway-side port of the edge node 103 is assigned as a default gateway address for access from a server in the data center 121 to the WAN 101.

Server groups in the data centers 111 and 121 are placed under the control of a DC manager 162 (a server for managing server groups). For closed-type management within a data center, a closed-type server may be used for each of the data centers 111 and 121. However, for VM migration between the data centers, it is required to provide a common management server. The DC manager 162 is intended for this purpose. There may also be provided an arrangement wherein a manager server 150 is used for direct management of server groups in data centers 111 and 121. The DC manager 162 is connected to a management-specific VLAN M 161 provided between the data centers 111 and 121, and each server in the two data centers, i.e., each of the servers 113, 123, and 124 is also connected to the management-specific VLAN M 161.

The management-specific VLAN M 161 is used not only for transferring instructions and replies for server management but also for transferring VM memory contents and VM storage contents at the time of VM migration. It is therefore required to secure an adequate bandwidth. The management-specific VLAN M 161 may be implemented by providing physical Ethernet connection between the two data centers 111 and 121. The implementation of the management-specific VLAN M 161 may also be made by providing tunneling through use of the L2TP (Level 2 Tunneling Protocol) for VLAN/IP network L2 path formation via the edge nodes 102 and 103 of the WAN 101 or through use of the VPLS (Virtual Private LAN Service), for example.

In the first preferred embodiment of the present invention, the VLAN M 161 is used as a management-specific network provided between the two data centers as mentioned above. In cases where the DC manager 162 is designed to have functionalities for IP-network-based management and MV migration, the VLAN M 161 may be replaced with an IP network, e.g., a network of the WAN 101. Since conventional server management is carried out in a closed form within a data center, it is preconditioned that the DC manager 162 should be used in LAN application. Hence, the VLAN M 161 is adopted in the first preferred embodiment of the present invention.

The user network 131 is connected to the edge node 104 via a gateway 132. A client terminal PC (personal computer) 133 is connected to a LAN having connection to the gateway 132. The user network 141 is also connected to the edge node 104 via a gateway 142. A client terminal PC 143 is connected to a LAN having connection to the gateway 142.

The manager server 150, which is used as a PC server, includes a manager program 151. The manager program 151 is designed to carry out management of the WAN 101 and also to function as a setting program for issuing instructions to the servers or the like included in the data centers 111 and 121 for server management as mentioned above. It is to be noted however that, instead of issuing instructions directly to such devices included in the data centers 111 and 121 as the server 113 and the gateway 112, the manager program 151 may issue instructions thereto by way of the DC manager 162 arranged for use common to the data centers 111 and 121. Hence, the manager server 150 and the DC manager server 161 are herein also referred to generically as "manager computers" wherever appropriate.

The above-mentioned servers and client terminals included in the networks concerned, i.e., the servers 113, 123, and 124, the manager server 150, the DC manager server 161, and PCs 133 and 143 are ordinary computers, each including circuit sections interconnected by internal bus lines or the like, i.e., a processing section corresponding to a central processing unit (CPU), a storage section including a memory and a storage device, an interface section for network connection, and an input/output section including a keyboard and a display device. It will be obvious to those skilled in the art that the VMs 114 and 125 can be implemented by CPU execution of a program stored in a memory.

Figure 2:
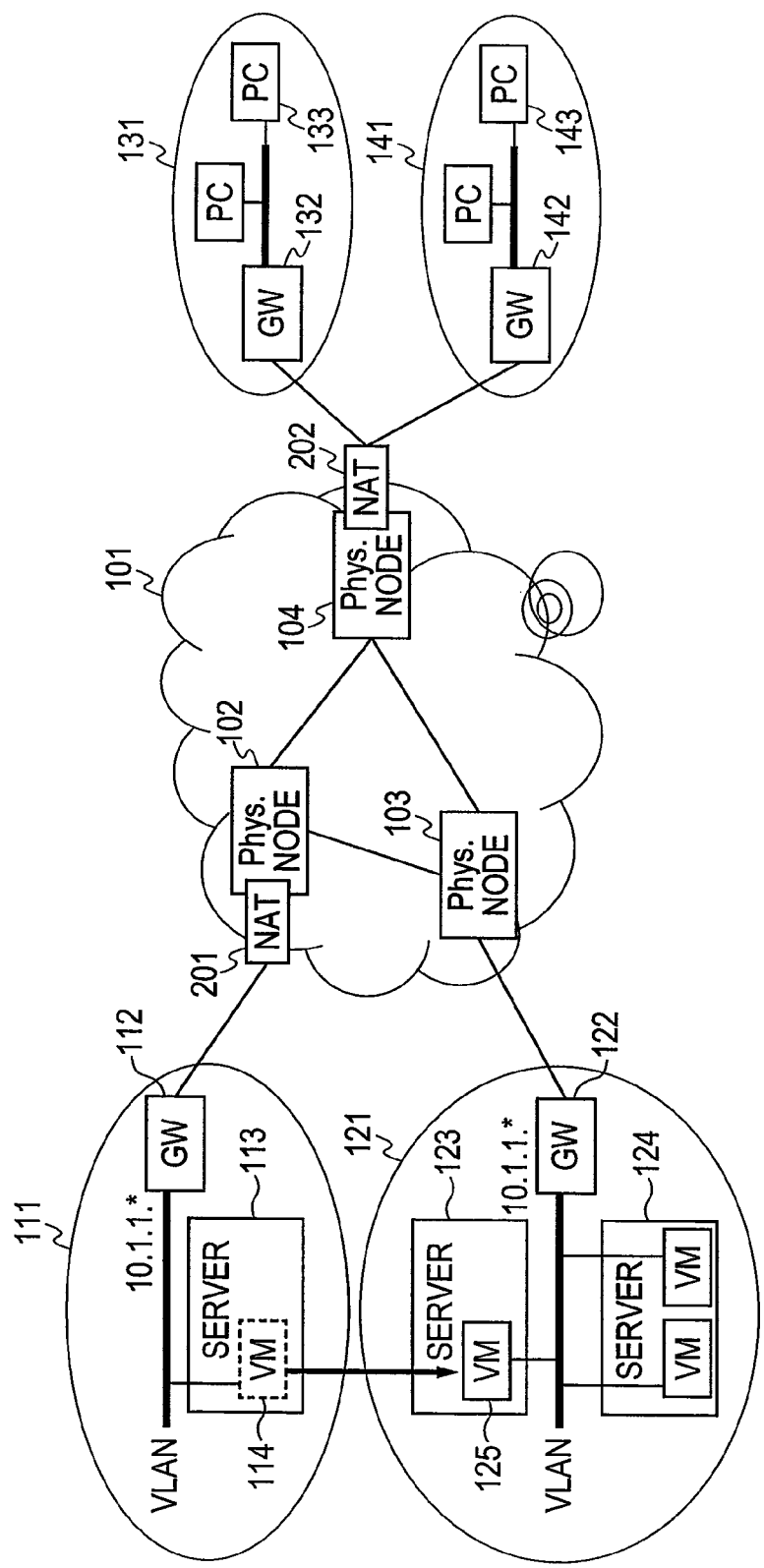
FIG. 2 is a diagram showing an overview of a network system according to the first preferred embodiment of the present invention.

With reference to FIG. 2, there is described below an overview of a network system according to the first preferred embodiment of the present invention. In the network system shown in FIG. 2, a function NAT 201 is applied to packets to be input from the gateway 112 to the edge node 102, and also to packets to be output from the edge node 102 to the gateway 112. Further, a function NAT 202 is applied to packets to be input from the gateways 132 and 142 to the edge node 104, and also to packets to be output from the edge node 140 to the gateways 132 and 142.

The following rule (1) is registered in the NAT 201. This rule (1) will not be altered.

$$\text{rule LAN:Source } S \leftrightarrow S':\text{WAN} \qquad (1)$$

A list of rules can be represented in the form of a table, and each rule can be indicated by using columns of the table. The rule (1) includes columns S and S' of the table concerned.

In the NAT 201, regarding a packet to be transferred from the first LAN, i.e., the gateway 112 to the first network, i.e., the WAN 101, it is judged whether the subnet of a sender address of the packet is S or not. If the subnet concerned is S, i.e., if the sender address is found to belong to a subnet used in the data center 111, the subnet is replaced with S'. In this case, the relevant address in the subnet is preserved intact. Note also that packets belonging to any other subnets are not subjected to address translation. Further, in accordance with the rule (1), regarding a packet to be transferred from the WAN 101 to the first LAN, i.e., the gateway 112, it is judged whether a recipient address of the packet belongs to a subnet used in the data center 111 or not. If the recipient address is found to belong to a subnet used in the data center 111, replacement with S is performed (the subnet concerned is S).

More specifically, in an example where the subnet S is 10.1/16 and the subnet S' is 10.2/16, the following rule (2) is given.

rule LAN:Source 10.1/16<-->10.2/16:WAN    (2)

This rule signifies that, when a subnet 10.1/16 (10.1.*.*) is used in a data center, the corresponding subnet in the WAN 101 is set to 10.2/16 (10.2.*.*). That is, regarding a packet to be transferred from the data center 111 to the WAN 101, 10.1 is translated into 10.2, and regarding a packet to be transferred from the WAN 101 to the data center 111, 10.2 is translated into 10.1. In either case, the relevant address in the subnet is preserved intact.

In the NAT 202, the following rule (3) is registered as an initial state thereof.

rule WAN:Source S'<-->S:LAN    (3)

In the NAT 202, regarding a packet to be transferred from the WAN 101 to the gateway 132 (LAN: user network), it is judged whether the subnet of a sender address of the packet is S' or not. If the subnet concerned is S', the subnet is replaced with S. In this case, the relevant address in the subnet is preserved intact. Note also that packets belonging any other subnets are not subjected to address translation. Further, in accordance with the rule (3), regarding a packet to be transferred from the gateway 132 (LAN: user network) to the WAN 101, it is judged whether the subnet of a sender address of the packet is S or not. If the subnet concerned is S, the subnet is replaced with S'.

That is, in the initial state, all the packets having addresses belonging to the subnet concerned are interchanged between the data center 111 and network users. At the time of VM migration, an alteration, deletion or addition is made on the rule registered in the NAT 202 as described later. Thus, packets related to a migrated VM can be interchanged between the data center 121 and the user concerned.

In another format of rules in the NAT 201 and NAT 202, an address range is specifiable instead of subnet addressing as mentioned above. For example, the rule (2) can be expressed as shown below.

rule LAN:Source 10.1.1.1-10.1.255.255<-->10.2.1.1-10.2.255.255:WAN

This rule signifies that addresses ranging from 10.1.1.1 to 10.1.255.255 are translated into addresses ranging from 10.2.1.1 to 10.2.255.255. The contents to be translated are equivalent to those indicated by the rule (2).

Figure 3:
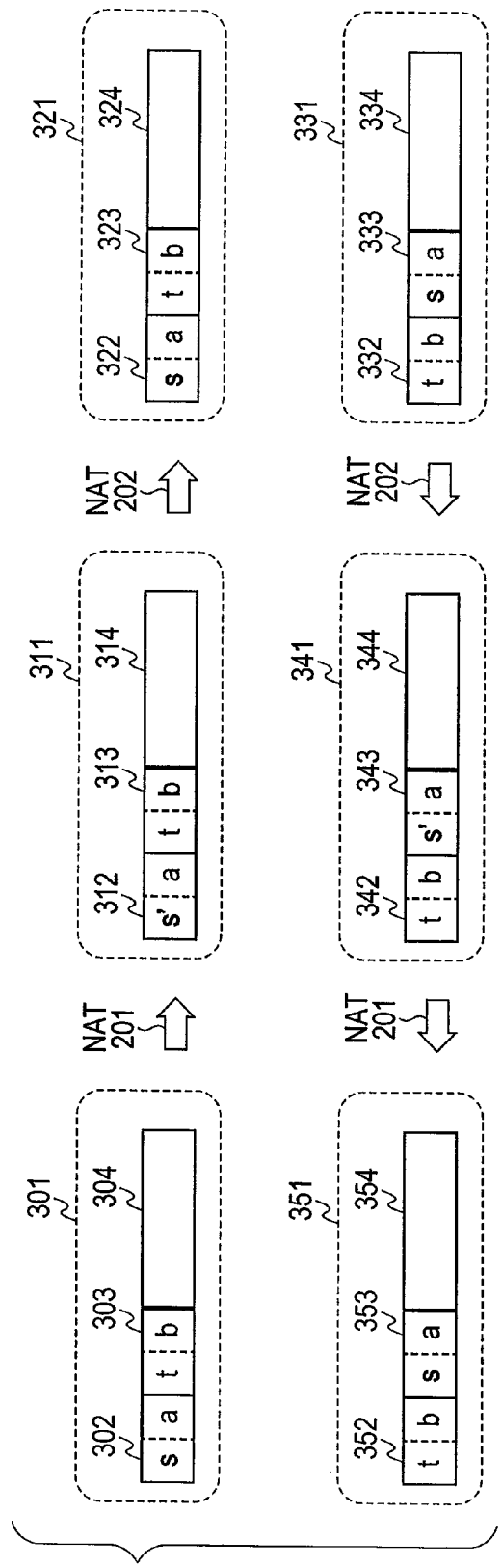
FIG. 3 is a diagram showing changes in packet contents in NAT application according to the first preferred embodiment of the present invention.

Referring to FIG. 3, there is shown an explanatory diagram concerning changes in packet contents in a case where the NAT 201 and the NAT 202 in the initial state are applied. A packet 301 represents a packet to be transmitted from the VM 114 to the PC 133. In the packet 301, a transmission source address 302 includes an address of the VM 114 "sa" (the subnet concerned is "s", and the relevant address in the subnet is "a"; e.g., "s" is 10.1/16 or 10.1.*.*, and "a" is 2.3 (*.*.2.3)), and a transmission destination address 303 includes an address of the PC 133 "tb" (the subnet concerned is "t", and the relevant address in the subnet is "b"). A packet 311 represents a packet form to be taken after the packet 301 passes through the NAT 201. In the packet 311, a transmission source address 312 indicates "s'a" in lieu of "sa" due to translation (i.e., only the subnet concerned has been translated from s to s'). The other portions are preserved intact. A packet 321 represents a packet form to be taken after the packet 301 passes through the NAT 202. In the packet 321, a transmission source address 322 indicates "sa" in lieu of "s'a" due to inverse translation. The other portions are preserved intact.

A packet 331 represents a packet to be transmitted from the PC 133 to the VM 114. In the packet 331, a transmission source address 332 includes an address of the PC 133 "tb", a transmission destination address 333 includes an address of the VM 114 "sa". A packet 341 represents a packet form to be taken after the packet 331 passes through the NAT 201. In the packet 341, a transmission source address 343 indicates "s'a" in lieu of "sa" due to translation. The other portions are preserved intact. A packet 351 represents a packet form to be taken after the packet 341 passes through the NAT 201. In the packet 351, a transmission source address 353 indicates "sa" in lieu of "s'a" due to inverse translation. The other portions are preserved intact.

The gateway 112 and the gateway 122 can provide advertising notification of subnet routing in each data center to the WAN 101. When the gateway 112 provides advertising notification of subnet routing to the WAN 101, the edge node 102 receives the advertising notification therefrom as advertising notification about a translated subnet address, i.e., s'. When the gateway 122 provides advertising notification of subnet routing to the WAN 101, the edge node 103 receives the advertising notification therefrom in an intact form (as advertising notification about an untranslated subnet address, i.e., s). Such advertising notification as mentioned above can be provided in an initial state and subsequent states, not depending on in which data center the VM concerned exists. Note that, when the edge node 104 provides routing information to each of the user networks 131 and 141, it is required to transfer only the information regarding the subnet s.

Then, the following describes a VM migration method designed for power-saving implementation. First, with reference to FIG. 5, a general execution procedure of the manager program 151 will be explained below. Note that this VM migration method is common to the first and second preferred embodiments of the present invention.

Figure 5:
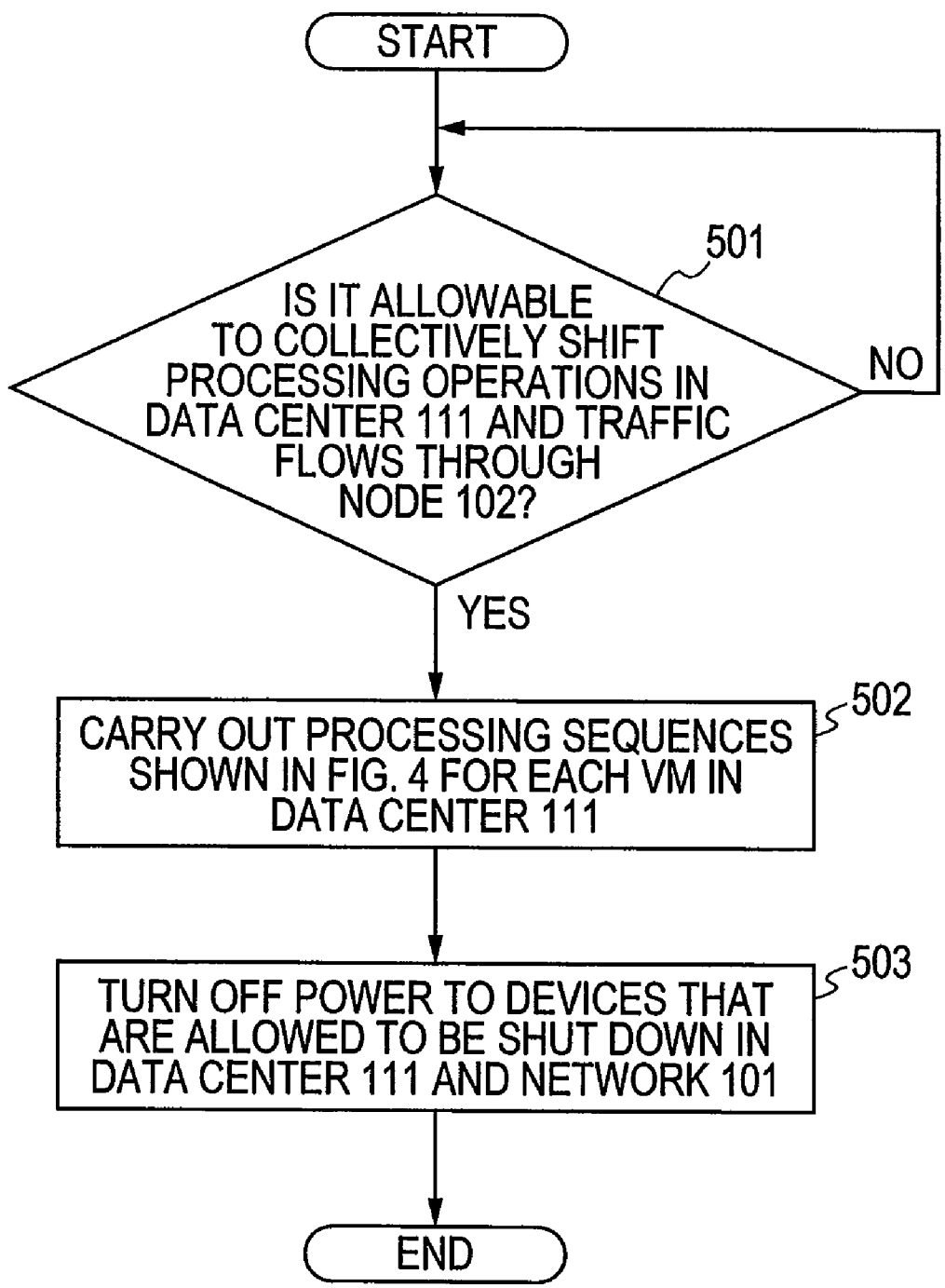
FIG. 5 is a flowchart showing a general execution procedure of a manager program in a VM migration method designed for power-saving implementation according to the first and second preferred embodiments of the present invention.

At step 501 in the flowchart shown in FIG. 5, the manager program 151 constantly monitors the current state of each network node included in the data center 111, the data center 121, and the WAN 101 in a direct manner or in an indirect manner by way of the DC manager 162. Through this monitoring, it is judged whether or not the current processing operations in the data center 111 and the current traffic flows through the edge node 102 can be collectively shifted to the data center 121 and the edge node 103, respectively. It is preferable to form a judgment at such a point of timing that a changed state persistent for a certain period in the data center 111/121 or the WAN 101 is indicated directly from the network node or server concerned or indirectly by way of the DC manager 162 or a subordinate network management server.

For monitoring the state of each of the data centers 111 and 121, the manager program 151 receives information regarding each server and VM in the data centers 111 and 121 from the DC manager 162 used for managing VMs and network resources. For monitoring the state of the WAN 101, the following monitor functions of the edge nodes 102, 103, and 104 are available; MIB (Management Information Base) functions and protocol functions conforming to the IETF (Internet Engineering Task Force) standards such as RMON (Remote network MONitoring), NetFlow, and IPFIX (IP Flow Information eXport). These functions may be used directly by the manager program 151. In a large-scale network, direct monitoring tends to increase overhead in processing. To circumvent this in such a case, it is preferable to use plural subordinate network management servers.

With monitoring information, the manager program 151 in the manager server 150 judges whether all the VMs running in the data center 111 can be moved/transferred to the data center 121 in terms of allowance in processing throughput. If the allowance in processing throughput is inadequate, the collective shifting of all the VMs to the data center 121 is not carried out. Further, the manager program 151 judges whether all the loads of traffic flows through the edge node 102 from the data center 111 and to the data center 111 can be shifted to a route passing through the edge node 103 in terms of allowance in capacities of the edge node 103 and links connected therewith. If the allowance in capacities of the edge node 103 and links connected therewith is inadequate, the collective shifting of all the loads of traffic flows concerned to the route passing through the edge node 103 is not carried out. Further, there is a probability that the edge node 102, besides being connected to the data center 111, may also be connected to a different LAN or the like. Hence, it is judged whether, in a power-off state of the edge node 102, traffic to the different LAN or the like and therefrom can be processed continuously by using a route passing through another network node for normal communication. Still further, it is judged whether, in a power-off state of the edge node 102, there can be provided an adequate degree of allowance in capacities of the relevant network node and links connected therewith.

Figure 4:
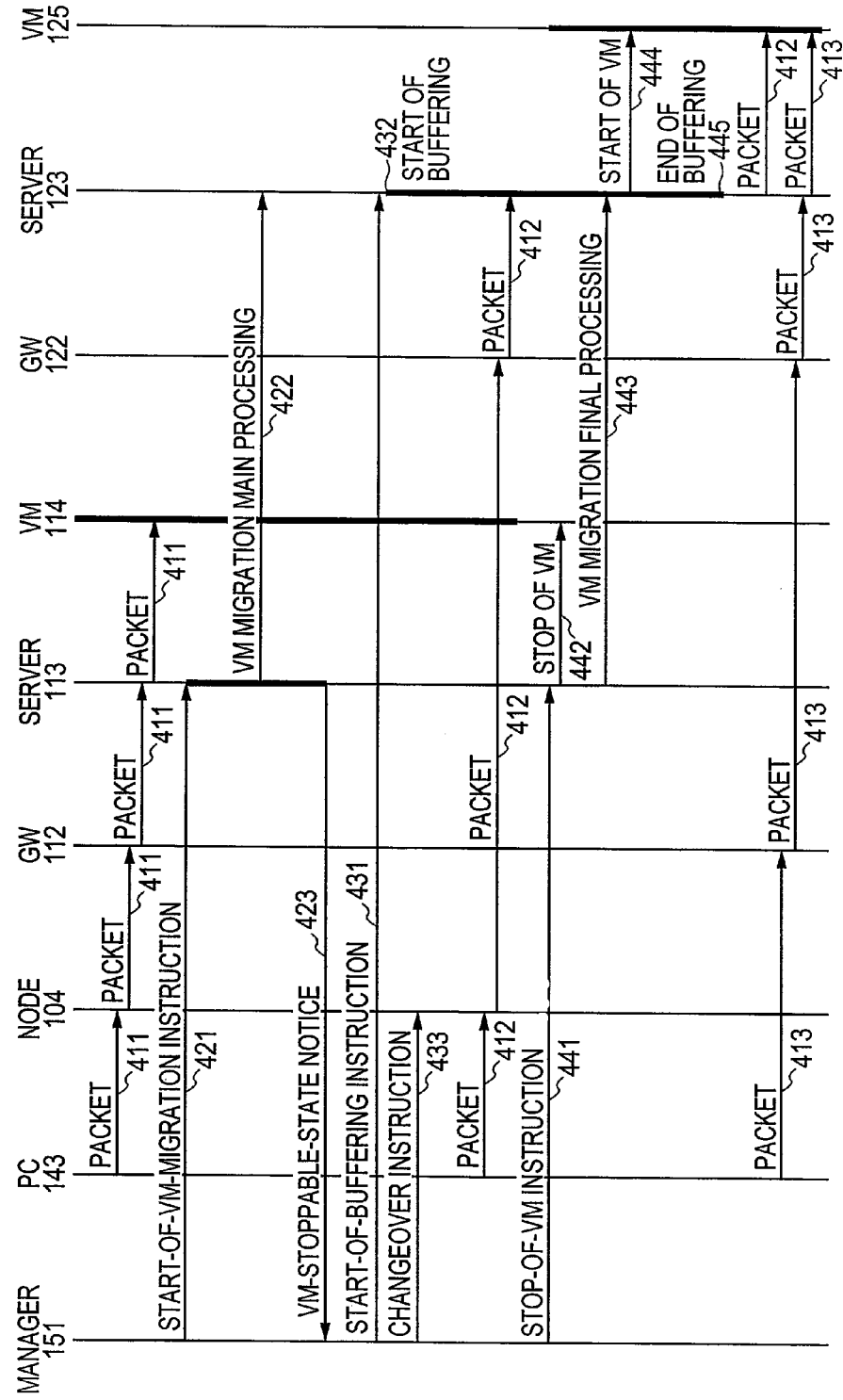
FIG. 4 is a diagram showing an exemplary procedure for migration of one VM according to the first and second preferred embodiments of the present invention.

At step 501, the manager program 151 forms a synthetic judgment through examination of the above-mentioned conditions. If it is found that the collective shifting of the processing operations and traffic flows is allowable, program control proceeds to step 502. At step 502, each VM in the data center 111 is subjected to migration processing sequences shown in FIG. 4 to be described later. Although the processing sequences shown in FIG. 4 are not exclusive to the manager program 151, each processing sequence is started by the manager program 151 at least in principle. On completion of the processing sequences shown in FIG. 4, program control proceeds to step 503. At step 503, the manager program 151 turns off power to devices that are allowed to be shut down in the data center 111 and the WAN 101. This power-off procedure is carried out directly by the manager program 151 or indirectly by way of the DC manager 162 or a subordinate network management server. Regarding the WAN 101, the edge node 102 may be shut down entirely. However, if the edge node 102 is shut down entirely, it will take a considerably long period of time to restart the edge node 102 by turning on power again. Hence, in cases where the amount of traffic or the amount of data processing is predicted to increase again within a relatively short time, it is preferable to put the edge node 102 in a sleep state for ready restoration. Regarding the data center 111, a judgment is formed similarly on whether power is turned off entirely or partially, and a proper power-off procedure is carried out according to the result of the judgment.

Then, with reference to FIG. 4, an exemplary procedure for migration of the VM 114 will be explained below. Note that this VM migration procedure is common to the first and second preferred embodiments of the present invention. The VM 125 is a destination virtual machine in migration of the VM 114. The VM 125 has an IP address and a MAC address that are identical to those of the VM 114. These addresses are deleted from the VLAN D 116 after stoppage of the VM 114, and then new IP and MAC addresses can be created on the VLAN D' 126. It is to be noted that new IP and MAC addresses may also be created on the VLAN D' 126 prior to completion of migration of the VM 114, i.e., it is allowed to coexistently provide IP and MAC addresses that are assigned before and after VM migration. Since the VLAN D 116 and the VLAN D' 126 are independent of each other, no problem will occur even if IP and MAC addresses assigned before and after VM migration are provided coexistently. In such an arrangement, regarding MAC addressing in particular, a learning function of a switch on the VLAN D' 126 may be made active in advance. Thus, upon completion of VM migration, it is possible to resume communication without confusion on the VLAN D' 126.

Before migration, the VM 114 communicates with the user concerned through the gateway 112. Contrastingly, after migration thereof, the VM 125 communicates with the user through the gateway 122. Hence, for enabling communication to be resumed immediately after completion of VM migration, it is preferable to assign identical LAN-side MAC and IP addresses to the gateways 112 and 122. Thus, even in packet transmission based on such a protocol as ARP (Address Resolution Protocol) or RARP (Reverse ARP), the VM 125 receives a replay identical to that in the case of packet transmission from the VM 114, i.e., communication can be performed continuously with no problem and no delay.

The VM 114 is in communication with the PC 143 on the user network 141 in the example shown in FIG. 4. A packet 411 indicates a packet that is output from the PC 143 before the start of VM migration processing. The packet 411 output from the PC 143 arrives at the server 113 by passage through the edge node 104 and the gateway 112. Then, in the server 113, the packet 411 is passed to the MV 114 being active therein. When step 502 is placed into execution, the manager program 151 issues a start-of-VM-migration instruction 421 to the server 113 directly therefrom or indirectly by way of the DC manager 162. In cooperation between the server 113 and the server 123, data on a memory, data on a virtual disk, and the like used by the VM 114 in the server 113 are copied to the server 123 through use of the management-specific VLAN M 131. In this processing, the VM 114 should be kept active.

At the end of VM copying (migration), the server 113 working as the first server returns a VM-stoppable-state notice 423 to the manager program 151 or the DC manager 162. Since the VM 114 is kept active for processing execution during the VM copying, memory contents in the VM 114 may be altered to cause difference from those in the VM 125. To check the occurrence of difference in memory contents between the VM 114 and VM 125, it is preferable to use a memory page flag for indicating the presence/absence of a write-in event. The VM-stoppable-state notice 423 is generated when the difference becomes satisfactorily smaller.

Upon receiving the VM-stoppable-stage notice 423 from the server 113, the manager program 151 or the DC manager 162 issues a start-of-buffering instruction 431 to the server 123, a changeover instruction 433 to the edge node 104, and a stop-of-VM instruction 441 to the server 113. The start-of-buffering instruction 431 indicates the start of packet buffering operation wherein packets to the VM 125 in the server 123 working as the second server are stored in the server 123 until the VM 125 is started.

In the sequence mentioned above, the start-of-buffering instruction 431 also indicates that addresses for the MV 125 should be generated. That is, for the VM 125, a MAC address and an IP address identical to those of the VM 114 are generated. At the time of generating a MAC address, an RARP message containing the MAC address concerned can be issued from the server 123. Alternatively, at the time of generating MAC and IP addresses, an ARP message containing the MAP and IP addresses concerned can be issued from the server 123. These messages are used to provide LAN-wide notification (broadcast) of these addresses. Further, the changeover instruction 433 indicates that the packet destination should be changed over to the VM 125 that has been provided as the result of migration.

The packet buffering operation in the server 123 is performed for the purpose of minimizing a rate of packet discarding attributable to VM migration. In a situation where plural VMs being migrated are included in the server 123, a buffer area is reserved for each VM so that buffering is performed for each VM. In a conventional VM migration method, a multiplicity of packets are discarded inevitably at the time of VM migration, thereby causing such a problem as stoppage of audio data/motion picture data in realtime applications. It is possible to address this problem by performing packet buffering.

In cases where packet discarding can be suppressed without resort to buffering, it is not required to perform buffering, i.e., it is not required to issue the start-of-buffering instruction 431. The start-of-buffering instruction 431 may also be issued from the server 113 instead of being issued from the manager program 151 or the DC manager 162. It is preferable, however, to issue the start-of-buffering instruction 432 from the manager program 151 as mentioned above since transmission timing with the changeover instruction 433 can be optimized.

In the first preferred embodiment of the present invention, the changeover instruction 433 is used to change the setting of the NAT 202 at the edge node 104. In the second preferred embodiment of the present invention, the changeover instruction 433 is used to perform a virtual network changeover. In changing the setting of the NAT 202, an alteration, deletion or addition is made on an existing rule registered in the NAT 202. Thus, a procedure is taken so that the existing rule in the NAT 202 will not be applied to addressing of a migrated VM. For example, in an instance where the existing rule is applied to a range of addresses 10.1.1.1-10.1.255.255 (i.e., the rule (2) indicated above) and where a migrated VM has an address 10.1.123.45, the existing rule is divided into two as shown below.

```
rule WAN:Source 10.1.1.1-10.1.123.44<-->10.2.1.1-
    10.2.123.44:LAN rule WAN:Source 10.1.123.468-10.1.255.255<--
    >10.2.123-10.2.255.255:LAN
```

When an applicable address range is emptied due to the changeover instruction 433 or when no gap is left between address ranges of two rules, the rules may be deleted or rearranged. Thus, in cases where all the rules can be stored in a high-speed memory through such a procedure as exemplified above, it is possible to bring about enhancement in processing speed.

After issuance of the changeover instruction 433, a packet 412 output from the PC 143 is transferred from the edge node 104 to the gateway 122, then arriving at the server 123. Since the VM 125 is not yet active, the packet 412 is stored in the server 123.

Upon receiving the stop-of-VM instruction 441, the server 113 stops operation of the VM 114 (442), and carries out a VM migration final processing 443. In the VM migration final processing, difference in memory contents is sent from the server 113 to the server 123 through use of the management-specific VLAN M 131. Thus, with no difference between the VM 114 and the VM 125, the VM 125 can be started after the VM 114 is put in a stopped state. On completion of the VM migration final processing 443, the server 123 starts up the VM 125 (444). Further, the server 123 terminates packet buffering (445), and then to the VM 125, the server 123 outputs stored packets in succession. After completion of the processing sequences mentioned above, a packet 413 is output from the PC 143. The packet 413 arrives at the server 123 by passage through the edge node 104 and the gateway 122 in a manner similar to the case of the packet 412 mentioned above. Being different from the case of the packet 412, the packet 413 is directly passed to the VM 125 from the server 123.

In the example shown in FIG. 4, it is assumed that the VM-stoppable-state notice 423 is received from the server 113, and according thereto, the manager program 151 issues the start-of-buffering instruction 431 and the changeover instruction 433. However, these sequences may not be taken in an application where conventional server management software such as VMware is employed. That is, the conventional server management software carries out a series of sequences up to the start of VM automatically, so that the manager server 151 cannot receive the VM-stoppable-state notice 423 from the server 113. In such a case, an exemplary procedure shown in FIG. 7 is applicable.

Figure 7:
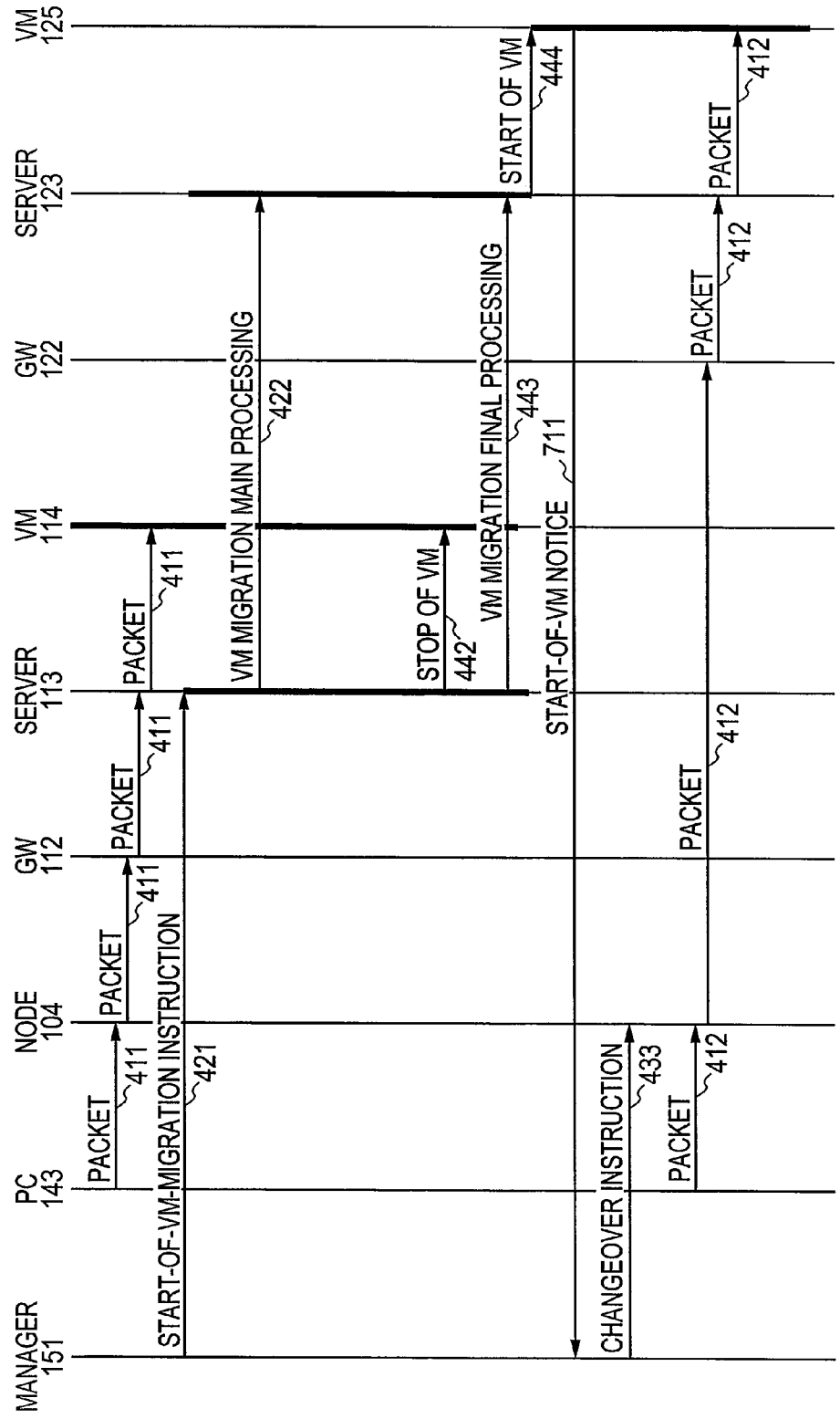
FIG. 7 is a diagram showing another exemplary procedure for migration of one VM according to the first and second preferred embodiments of the present invention.

In the example shown in FIG. 7, the processing operations up to VM migration main processing 422 are performed in the same manner as those in FIG. 4. Differently from the case in FIG. 4, the VM-stoppable-stage notice 423 is not issued. The stop of VM 442, VM migration final processing 443, and start of VM 444 are effected through communication among the DC manager 162, the server 113, and the server 123. After the start of VM 444, it is necessary to provide LAN-wide notification (broadcast) of MAC and IP addresses of a VM that has been started. For this purpose, a start-of-VM notice 711 is generated by using such a protocol as ARP (Address Resolution Protocol) or RARP (Reverse ARP) in ordinary practice. The ARP is applicable for notification of both the MAC and IP addresses of each VM, and the RARP is applicable for notification of only the MAC address of each VM.

Since the manager program 151 does not reside on the LAN concerned, it is not allowed for the manager program 151 to directly receive notification packets that are broadcast on a LAN-segment basis. Hence, on the LAN, there is provided an auxiliary program for receiving these packets. Thus, the manager program 151 can receive the start-of-VM notice 711 from the auxiliary program. Upon receipt of the start-of-VM notice 711 from the auxiliary program, the manager program 151 generates the changeover instruction 433.

In the case mentioned above, for enhancement in changeover speed at the edge node 104, it is preferable to provide an arrangement wherein the changeover instruction 433 is issued directly from the auxiliary program to the edge node 104 instead of being issued indirectly from the manager program 151. In this arrangement, the manager program 151 provides the network node setting data concerned and the content of the changeover instruction 433 to the auxiliary program in advance.

After VM migration, the server 123 generates the address resolution protocol messages concerned. In a situation where the server 123 generates another specific kind of packet (having specific contents) after VM migration, the changeover instruction 433 may be issued by using the specific kind of packet as a trigger. Further, in a situation where the server 113 generates a specific kind of packet at the stop of the VM 114, the changeover instruction 433 may be issued by using the specific kind of packet as a trigger. Alternatively, the changeover instruction 433 may also be issued directly from the server 123 or the server 113 in lieu of the auxiliary program.

Then, with reference to FIG. 3, the following will explain changes in packets in a case where the NAT 201 and the NAT 202 after rule alteration are applied. The contents of a packet transmitted from the VM 125 to the PC 133 are equivalent to those of the packet 301. That is, in the packet transmitted from the VM 125 to the PC 133, an address of the VM 125 "sa" is included as a transmission source address, and an address of the PC 133 "tb" is included as a transmission destination address. Since the packet concerned is not subjected to network address translation, the contents thereof are preserved intact. Hence, even in an instance where the packet concerned and the packet 311 transmitted from the VM 114 (subjected to network address translation) are provided coexistently on the WAN 101 due to such a cause as a transfer delay, normal packet transmission can be performed without confusion since the transmission source addresses can be distinguished from each other.

Further, the contents of a packet transmitted from the PC 133 to the VM 125 are equivalent to those of the packet 331. That is, in the packet transmitted from the PC 133 to the VM 125, an address of the PC 133 "tb" is included as a transmission source address, and an address of the VM 125 "sa" is included as a transmission destination address. Since the packet concerned is not transferred by passage through network address translation, the contents thereof are preserved intact. Hence, even in an instance where the packet concerned and the packet 341 transmitted from the VM 114 (subjected to network address translation) are provided coexistently on the WAN 101 due to such a cause as a transfer delay, normal packet transmission can be performed without confusion since the transmission destination addresses can be distinguished from each other.

The VM migration method described hereinabove is intended for power-saving implementation. The following describes a VM migration method designed for load distribution. Note that this VM migration method is also common to the first and second preferred embodiments of the present invention.

Figure 8:
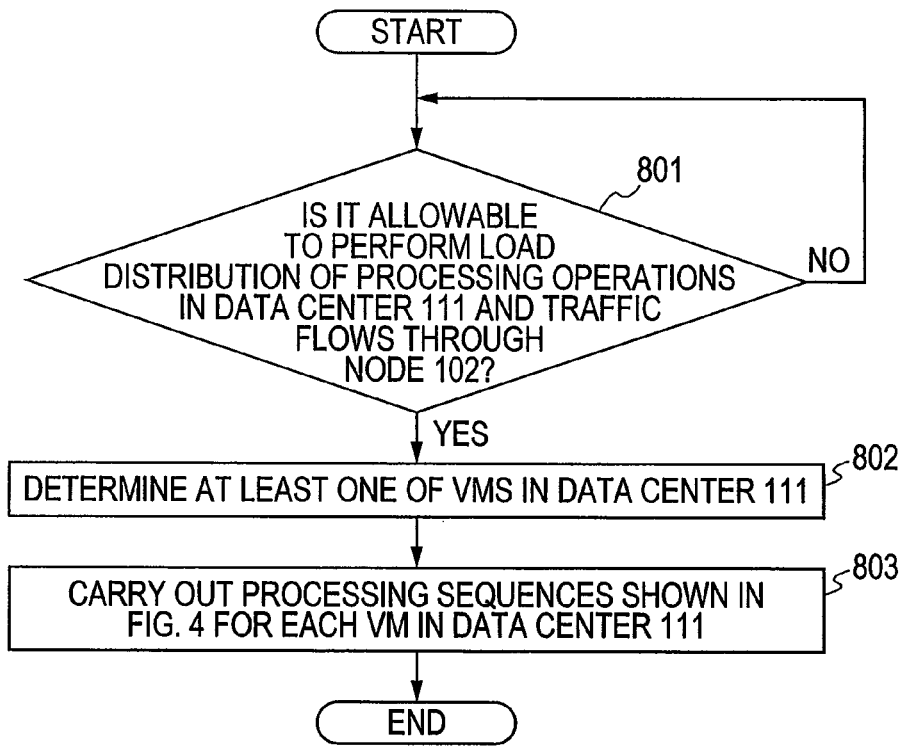
FIG. 8 is a flowchart showing a general execution procedure of a manager program in a VM migration method designed for load distribution according to the first and second preferred embodiments of the present invention.

Referring to FIG. 8, there is shown a flowchart concerning a general execution procedure of the manager program 151. At step 801 in the flowchart shown in FIG. 8, the manager program 151 constantly monitors the current state of each network node included in the data center 111, the data center 121, and the WAN 101 in a direct manner or in an indirect manner by way of the DC manager 162. Through this monitoring, it is judged whether or not the current processing operations in the data center 111 and the current traffic flows through the edge node 102 can be adjusted for load distribution. Note that load distribution will incur a certain degree of overhead required for VM migration. Hence, under a condition where load distribution is advantageous regardless of the certain degree of overhead, it is judged that the load distribution can be carried out. It is preferable to form a judgment at such a point of timing as that mentioned in the description of the VM migration method designed for power-saving implementation. Further, the state of each of the data centers 111 and 121 and the WAN 101 is monitored in the same manner as that in the VM migration method designed for power-saving implementation.

At step 801, if the manager program 151 judges that the load distribution concerned is allowable, program control proceeds to step 802. At step 802, at least one of the VMs in the data center 111 is determined to be migrated. This decision is made so that workloads will be distributed in a uniform fashion. Since computational processing in each server and traffic on each network vary incessantly with time, it is impossible to make perfect estimation based on the current or past data regarding the amount of computational processing and the amount of traffic. It is therefore not necessarily required to determine a perfectly optimum solution. Then, at step 803, each VM in the data center 111 is subjected to migration processing sequences shown in FIG. 4. Note that, in a situation where the relevant devices in the data center 121 and the edge node 103 have been powered off in the execution of VM migration for power saving, it is necessary to turn on power again and perform initial setting before proceeding to the processing sequences shown in FIG. 4.

Figure 9:
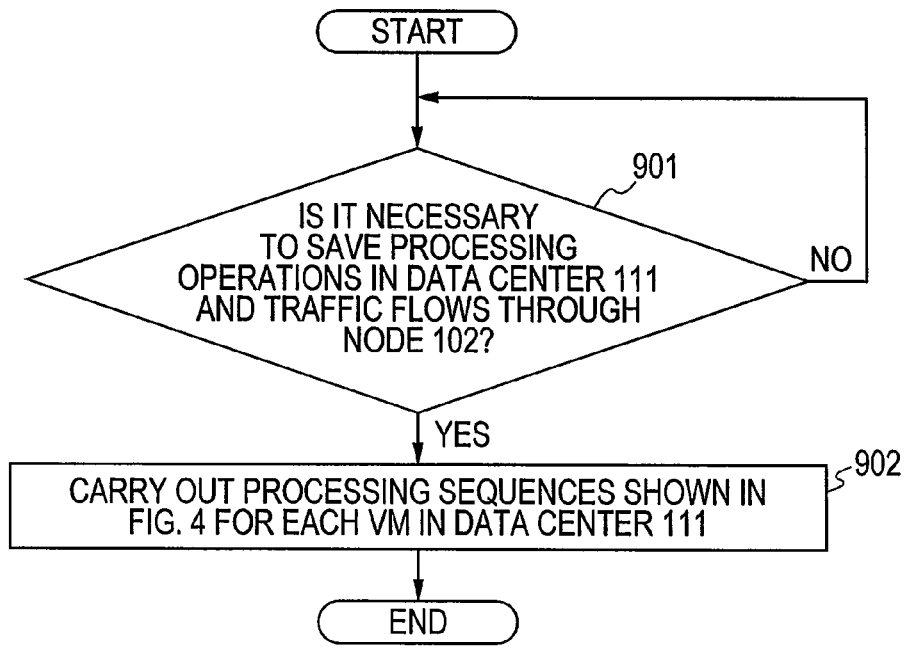
FIG. 9 is a flowchart showing a general execution procedure of a manager program in a VM migration method designed for fault countermeasure processing according to the first and second preferred embodiments of the present invention.

The VM migration method designed for load distribution can be carried out as described above. Then, the following describes a MV migration method designed for fault countermeasure processing. Referring to FIG. 9, there is shown a flowchart concerning a general execution procedure of the manager program 151. At step 901 in the flowchart shown in FIG. 9, the manager program 151 carries out monitoring to check for possible occurrence of a fault-inducing event such as excessive traffic congestion that may be brought about by emergency information regarding earthquake prediction or hostile aerial intrusion, for example. If necessary, the manager program 151 performs saving of the current processing operations in the data center 111 and the current traffic flows through the edge node 102.

At step 901, if the manager program 151 judges that the load distribution concerned is allowable, program control proceeds to step 902. At step 902, each VM in the data center 111 is subjected to migration processing sequences shown in FIG. 4. Note that, in a situation where the relevant devices in the data center 121 and the edge node 103 have been powered off in the execution of the VM migration for power saving, it is necessary to turn on power again and perform initial setting before proceeding to the processing sequences shown in FIG. 4.

Then, the following presents five supplementary descriptions concerning the first preferred embodiment of the present invention. Firstly, the NAT 201 and the NAT 202 are provided on the WAN 101 according to the first preferred embodiment described above. Further, there may also be provided a modified arrangement wherein the NAT 201 is provided in the gateway 112, and wherein the NAT 202 is provided in each of the gateways 132 and 142. In such an arrangement, a VM migration method of the present invention can be applied advantageously without the need to modify the relevant devices and functions on the WAN 101. Contrastingly, according to the first preferred embodiment described above, a VM migration of the present invention is applicable advantageously without the need to modify the relevant devices and functions in the data centers and user networks concerned.

Secondly, according to the first preferred embodiment described above, the NAT 201 is provided in the edge router 102 (edge node) connected to the data center 111 corresponding to the source of VM migration, while no NAT is provided in the edge router 103 (edge node) connected to the data center 121 corresponding to the destination of VM migration. Contrastingly, there may also be implemented a modified arrangement wherein no NAT is provided in the edge router 102 connected to the data center 111 corresponding to the source of VM migration, while the NAT is provided in the edge router 103 connected to the data center 121 corresponding to the destination of VM migration. That is, in the network system shown in FIG. 2, when a VM is migrated from the data center 121 to the data center 111, the rule registered in the NAT 202 is applied in an inverse translation manner at the time of issuance of the changeover instruction 433 (inverse translation with respect to translation in the first preferred embodiment). Thus, the user can perform communication with the VM concerned continuously. More specifically, the NAT is provided in each of the edge router 103 and the edge router 104, and before VM migration, a packet destined for the VM concerned in transmission from the relevant client PC is transferred through the edge router 104 and the edge router 102 without destination address translation. With a setting change in the edge router 104, a destination address of a packet destined for the VM in transmission from the client PC is subjected to a first translation in which an address of the VM is translated into a second address.

Thirdly, in a more common configuration, the NAT is provided in each of the edge router 102 connected to the data center 111 corresponding to the source of VM migration and the edge router 103 connected to the data center 121 corresponding to the destination of VM migration. The NAT 201 in the edge router 102 is used for subnet address translation from S into S', the NAT in the edge router 103 is used for subnet address translation from S into S", and the NAT 202 in the edge router 104 is used for inverse subnet address translation from S' or S" into S. This arrangement is advantageous in that subnet address translation is performed symmetrically with respect to the data center 111 and the data center 121. Further, in cases where VM migration is performed discretionally among three or more data centers, this arrangement is also applicable advantageously in an expanded fashion.

Figure 10:
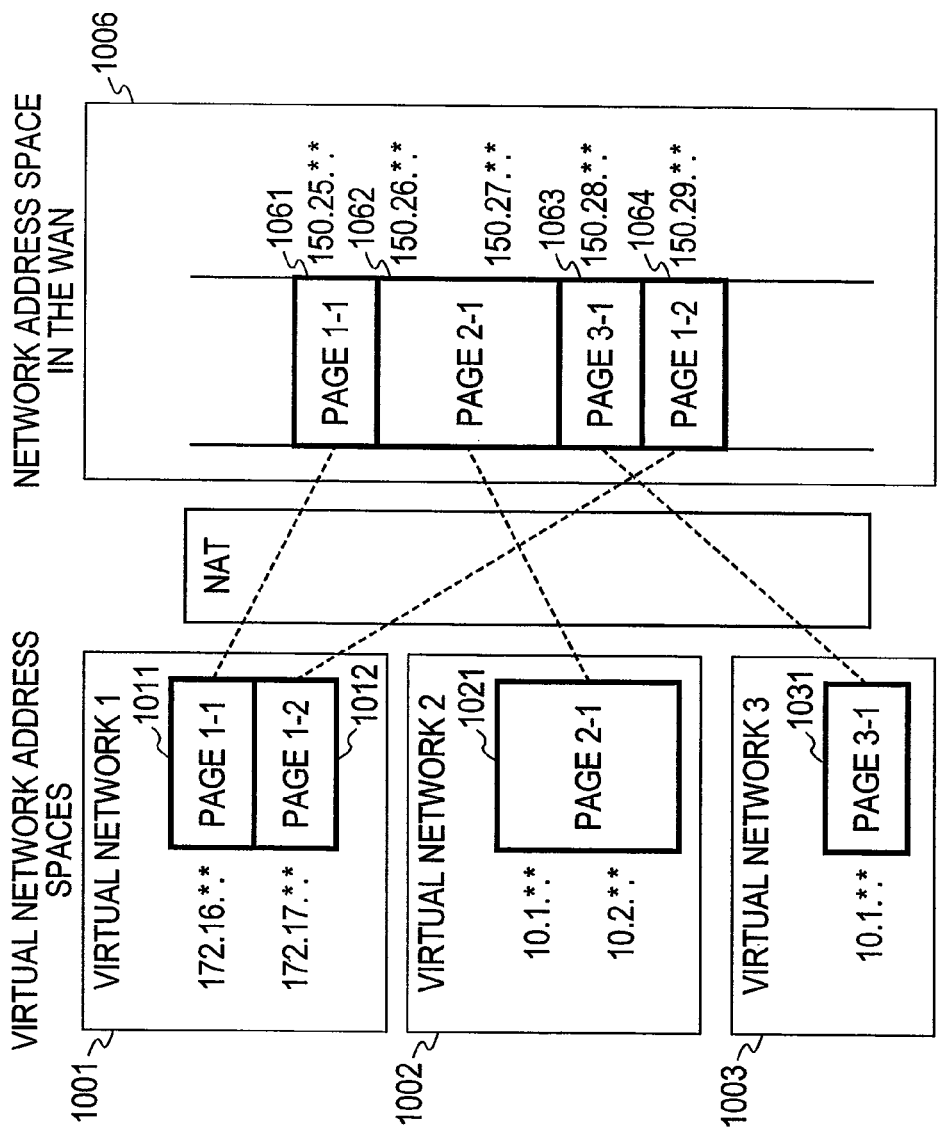
FIG. 10 is a schematic diagram for explaining higher-speed NAT implementation according to the first preferred embodiment of the present invention.

As shown in FIG. 10, for example, three data centers have distinct address spaces 1001, 1002, and 1003, which are mapped to one address space in the WAN in a nonduplicative fashion. Under a condition where the address space of each data center is divided into a plurality of subnets (pages), a unique address translation can be applied to each subnet. For instance, a subnet 172.16/15 in the address space 1001 is divided into a subnet 172.16/16 (172.16.*.*) 1011 and a subnet 172.17/16 (172.17.*.*) 1012. Thus, the subnet 172.16/16 can be translated into a subnet 150.25/16 (150.25.*.*) 1061, and the subnet 172.17/16 can be translated into a subnet 150.29/16 (150.29.*.*) 1064. Where each address space is divided into a plurality of subnets each having a uniform size as exemplified above, there can be provided a table to be indexed with subnet values, such as a page table in virtual memory. Using this table instead of the rules (1) and (2) or the like, it is possible to determine a translated subnet. Thus, higher-speed NAT implementation is made feasible. If this table is enlarged to an enormous size, it becomes impossible to place all the elements in high-speed memory. In such a case, the speed of address translation can be increased by placing frequently-accessed elements in high-speed cache memory.

Fourthly, according to the first preferred embodiment described above, the VM is migrated from the data center 111 to the data center 121. Instead of being used for migration on a basis of each VM, the method in the first preferred embodiment is also applicable to migration on a basis of each set of particular user data and programs or on a basis of each application. In this case, although migration cannot be detected by using such a protocol as ARP (Address Resolution Protocol) or RARP (Reverse ARP), the changeover instruction 433 can be generated when the server 125 corresponding to the destination of migration performs a sequence for the end of migration or the start of a migrated program.

Fifthly, according to the first preferred embodiment described above, an address of each VM and an address of a relevant communicating party are used for identification thereof. The method in the first preferred embodiment is also applicable to cases where each MV and a relevant communicating party are identified by any identifiers other than addresses, such as names. In these cases, an upper part of a composite-form name corresponds to a subnet. That is, in an instance where code a of name a.b is used to indicate a group of VMs and where code b thereof is used to indicate a particular VM in the group, the code a corresponds to the subnet concerned. At the time of translation, a is translated into a' without translation of b, resulting in a form of a'.b.

Second Preferred Embodiment

Figure 6:
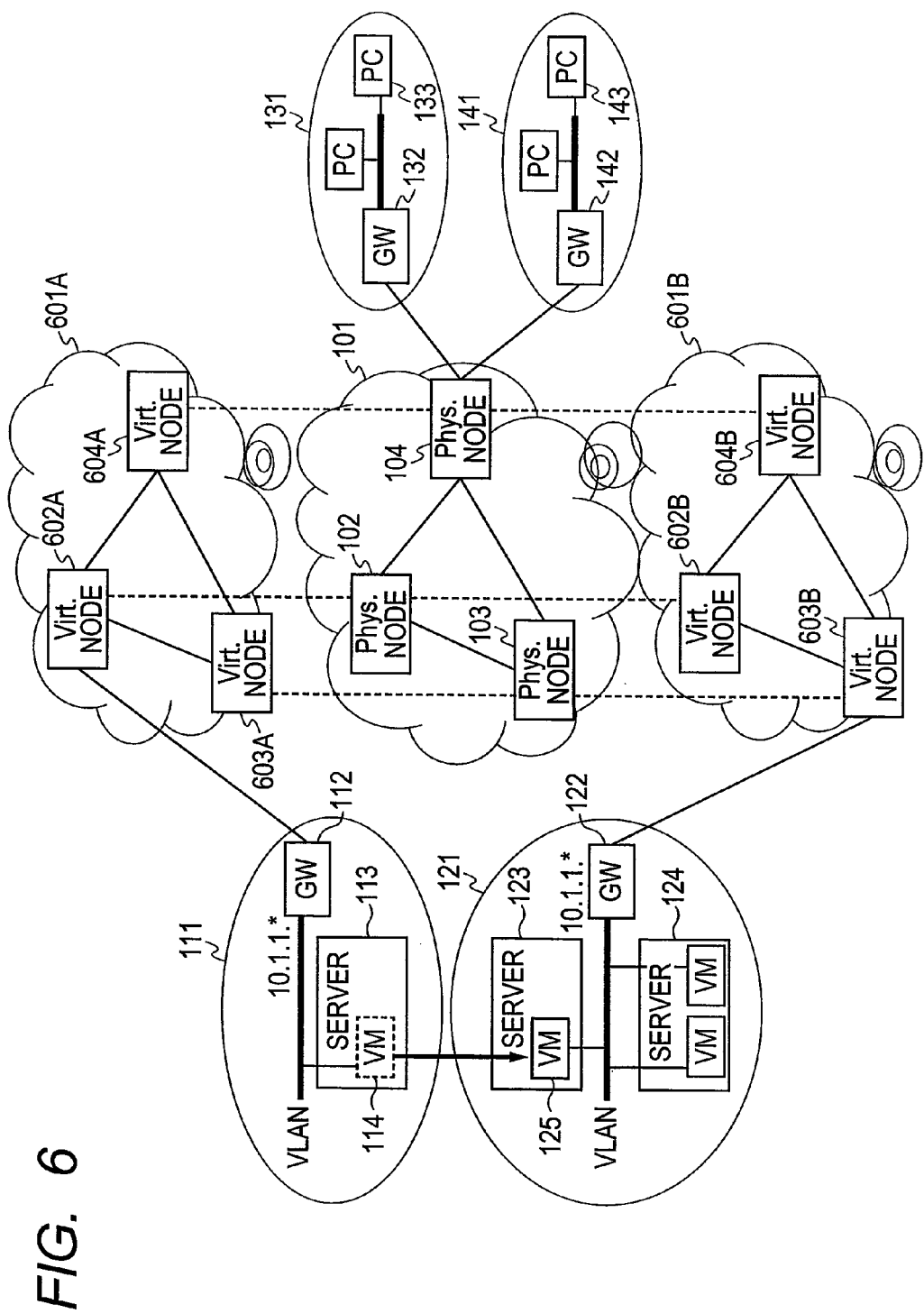
FIG. 6 is a diagram showing an overview of a network system according to the second preferred embodiment of the present invention.

The following describes an overview of the second preferred embodiment of the present invention with reference to FIG. 6. In the second preferred embodiment shown in FIG. 6, the WAN 101 is virtualized to provide two virtual networks 601A and 601B. These virtual networks are arranged to have a topology equivalent to that of the physical network 101. More specifically, the virtual network 601A includes a virtual node 602A corresponding to the physical node 102, a virtual node 603A corresponding to the physical node 103, and a virtual node 604A corresponding to the physical node 104. Likewise, the virtual network 601B includes a virtual node 602B corresponding to the physical node 102, a virtual node 603B corresponding to the physical node 103, and a virtual node 604B corresponding to the physical node 104.

A packet on the virtual network 601A and a packet on the virtual network 601B can coexist actually on the physical network 101. By an identifier of each packet, a wavelength of an optical path in use, a line (path) in use, or the like, it is identified which virtual network the packet concerned belongs to. As an identifier of each packet, a VLAN ID code or an MPLS (Multi-Protocol Label Switching) label is applicable. As a tunnel ID code in such a scheme as GRE (Generic Routing Encapsulation) tunneling, a key value or the like is applicable. To configure a virtual network on a WAN as mentioned above, it is required to use a network node having a virtualization function. As a router having a virtualization function based on MPLS, a Cisco Catalyst 6500 Series router is available, for example. As a switch having a virtualization function based on VLAN, an Alaxala AX-6700S Series switch is available, for example. By using these kinds of devices as network nodes, it is possible to implement network virtualization.

The internal configurations of the data center 111 and the data center 121 are equivalent to those of the first preferred embodiment shown in FIG. 2. The data center 111 communicates with the virtual node 602A, but does not have direct communication with the virtual node 602B. Further, the data center 121 communicates with the virtual node 603B, but does not have direct communication with the virtual node 603A.

The user networks 131 and 141 may also be virtualized. In this case, at the physical node 104, the virtual network 601A or the virtual network 601B is selected as a destination of transfer. When the virtual network 601A is specified as a destination of transfer, communication is made with the VM 114 in the data center 111. Alternatively, when the virtual network 601B is specified as a destination of transfer, communication is made with the VM 125 in the data center 121.

In the second preferred embodiment of the present invention, packet contents remain unchanged except an identifier of each virtual network, differently from the case of using NAT in the first preferred embodiment described above. Therefore, no description of packet contents is given here. The VM migration method designed for power-saving implementation and respective VM migration procedures in the first preferred embodiment are also applicable to the second preferred embodiment in principle. Differently from the case of the first preferred embodiment, at the time of issuance of the changeover instruction 433, instead of the elimination of the NAT 202, the virtual network 601A is changed over to the virtual network 601B.

A changeover from the virtual network 601A to the virtual network 601B is carried out as described below. At the edge node 104 in an initial state, an identifier 1a of the virtual network 601A is attached to a packet destined for a subnet S including an address A of the VM 114 in transmission from the user network 131 or 141. This operation of identifier attachment is expressed by the following rule.

if destination IP in S then add_label 1a

At the time of changeover, the above rule is superseded by the following rule having a higher level of priority, for attachment of an identifier 1b of the virtual network 601B.

if destination IP==A then add_label 1b

Thus, a packet destined for the address A of the VM 114 in transmission from the user network 131 or 141 is forwarded to the VM 125 in the data center 121, while a packet destined for another VM belonging to the subnet S is forwarded to the data center 111.

In an application scheme where an existing network node is to be used as the physical node 104, it may be found that the existing network node does not have a function for changing a virtual network identifier only. For instance, there is a kind of network node device not having a function for changing a virtual network identifier VLAN ID only but having a function for changing a virtual network identifier VLAN ID under a condition combined with another processing. In an Alaxala AX-6700 Series switch, for example, there is provided a identifier specifying function that allows specifying a virtual network identifier VLAN ID of a destination of IP packet transfer in combination with specifying the destination of IP packet transfer through use of a policy-based routing function. Although it is possible to change a virtual network identifier by using the identifier specifying function, an IP address in the physical node 104 cannot be specified as a destination of transfer through use of the policy-based routing function. Hence, a node group 1101 shown in FIG. 11 is used in lieu of the physical node 104 shown in FIG. 6.

Figure 11:
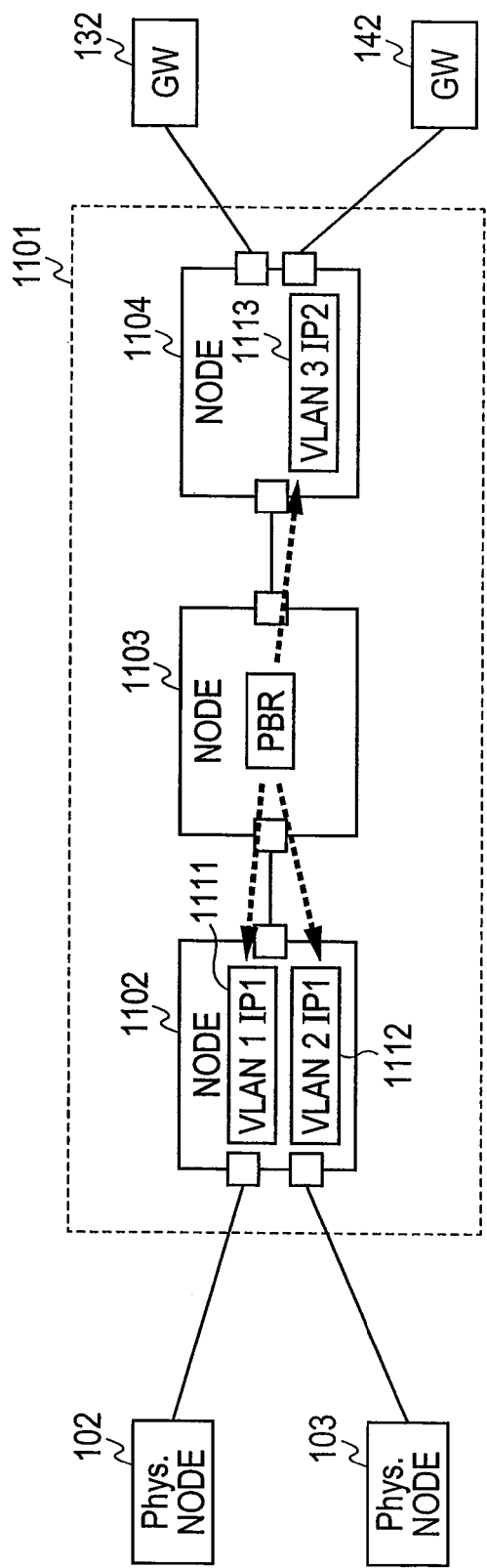
FIG. 11 is a diagram showing a specific configurational example of a node group according to the second preferred embodiment of the present invention.

In a configurational example shown in FIG. 11, the node group 1101 includes three physical nodes 1102, 1103, and 1104. Packets destined for the data center 111 or 121 in transmission through the gateways 132 and 142 are forwarded from the gateways 132 and 142 to the physical node 1104. Then, from the physical node 1104, these packets are transferred intact to the physical node 1103. At the physical node 1103, policy-based routing is applied to the packets. Then, the packets destined for the data center 111 are transferred to an IP address 1111 belonging to the virtual network 601A corresponding to the physical node 1102. In contrast, the packets destined for the data center 121 are transferred to an IP address 1112 belonging to the virtual network 601B corresponding to the physical node 1102. In this transfer operation, a virtual network identifier VLAN ID is changed.

For packets destined for the user PCs 133 and 143 in transmission from the data center 111 or 121, it is also required to perform VLAN ID change processing. Hence, these packets are forwarded to the physical node 1103 through the physical node 1102. At the physical node 1103, policy-based routing is applied to the packets for transfer to an IP address 1113 of a network including the gateways 132 and 142 corresponding to the physical node 1104. In this transfer operation, a virtual network identifier (VLAN ID) of the virtual network 601A or 601B is deleted or replaced with a virtual network identifier (VLAN ID) of a network including the gateways 132 and 143.

Figure 12:
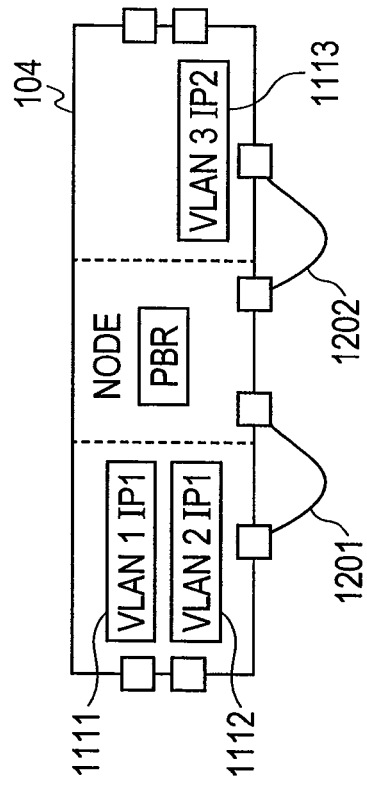
FIG. 12 is a diagram showing another specific configurational example of a node group according to the second preferred embodiment of the present invention.

In the arrangement mentioned above, three physical nodes are required in lieu of one physical node, thereby leading to an increase in cost. To circumvent this, it is preferable to use a virtualization function of the physical node 104 as shown in FIG. 12. More specifically, three virtual nodes are formed by using the physical node 104, and virtual interfaces thereof are coupled to physical interfaces. The physical interfaces are connected by links 1201 and 1202. Thus, using one physical node 104, there can be implemented a function equivalent to that of the network including the three physical nodes 1102, 1103, and 1104, thus making it possible to circumvent an increase in cost.

As can be understood from the foregoing description, the present invention has effective applicability in providing a useful technique for live migration of virtual machines among servers located at different network points.

The invention claimed is:

1. A method of virtual machine migration in a network configuration in which a first LAN is connected to a first node located on a first network for routing packets in accordance with routing information, in which a second LAN is connected to a second node located on the first network, and in which a second network is connected to a third node located on the first network, the method of virtual machine migration comprising:

under a condition where communication between a virtual machine running on a first server connected to the first LAN and a client connected to the second network is made through the first node and the third node, migrating the virtual machine to a second server connected to the second LAN without changing an address thereof on the first network;

performing a setting change in the third node in synchronization with migration of the virtual machine;

changing a route for the communication between the virtual machine and the client so that the communication there between is made through the second node and the third node in accordance with routing information of the first network; and enabling the client to continue communicating with the virtual machine that has been migrated to the second server, wherein, before completion of migration of the virtual machine, advertising notification of an address of the virtual machine is provided to the second LAN.

2. The method of virtual machine migration according to claim 1, wherein the first network is an IP network;

wherein each of the first node and the third node is provided with a network address translation function;

wherein, before migration of the virtual machine, a destination address of a packet destined for the virtual machine in transmission from the client is subjected to a first translation in which an address of the virtual machine is translated into a second address by using the network address translation function of the third node; and wherein, at the first node, the destination address of the packet destined for the virtual machine in transmission from the client is subjected to a translation from the second address into a first address, while a setting change in the third node is made so as not to perform the first translation, thereby accomplishing a changeover in routing for the communication between the virtual machine and the client.

3. The method of virtual machine migration according to claim 1, wherein the first network is an IP network;

wherein each of the second node and the third node is provided with a network address translation function;

wherein, before migration of the virtual machine, a destination address of a packet destined for the virtual machine in transmission from the client is transferred without translation through the third node and the first node; and wherein a setting change in the third node is made so as to perform the first translation in which the address of the virtual machine is translated into a second address, thereby accomplishing a changeover in routing for the communication between the virtual machine and the client.

4. The method of virtual machine migration according to claim 1, wherein the first network is a virtual network in which there are implemented first and second virtual networks, the first virtual network being connected to the first LAN but not being connected to the second LAN, and the second virtual network being connected to the second LAN but not being connected to the first LAN;

wherein, before migration of the virtual machine, a packet destined for the virtual machine in transmission from the client is transferred to the first virtual network through the third node;

wherein a setting change in the third node is made so that the packet destined for the virtual machine in transmission from the client is transferred to the first virtual network through the third node, thereby accomplishing a changeover in routing for the communication between the virtual machine and the client.

5. The method of virtual machine migration according to claim 1, wherein an address of the first node in the first LAN is made identical to an address of the second node of the second LAN.

6. The method of virtual machine migration according to claim 1, wherein a manager computer having a setting program is provided on the second LAN;

wherein, at the time of migration of the virtual machine to the second server, the first server generates a packet associated therewith; and wherein, upon capture of the packet, the setting program carries out a setting change in the third node.

7. The method of virtual machine migration according to claim 1, wherein a manager computer having a setting program is provided on the second LAN;

wherein, at the time of migration of the virtual machine to the second server, the second server generates a packet associated therewith; and wherein, upon capture of the packet, the setting program carries out a setting change in the third node.

8. The method of virtual machine migration according to claim 4, wherein, as an identifier of each virtual network, there is used a VLAN ID code, MAC address, MPLS label, tunnel additional information, or optical-path wavelength information.

9. The method of virtual machine migration according to claim 4, wherein a communication line to be used is changed instead of attaching an identifier to each virtual network.

10. A system of virtual machine migration in a network configuration in which a first network includes first, second, and third nodes for routing packets in accordance with routing information, and in which third, fourth, and second networks are connected to the first, second, and third nodes, respectively, the system of virtual machine migration comprising:

a first server connected to the third network; a second server connected to the fourth network; and a client terminal connected to the second network; wherein, under a condition where communication between a virtual machine running on the first server and the client terminal is made through the first node and the third node, the virtual machine is migrated to the second server without changing an address thereof on the first network;

wherein a setting change in the third node is performed in synchronization with migration of the virtual machine to change a route for the communication between the virtual machine and the client terminal so that the communication there between is made through the second node and the third node in accordance with routing information of the first network;

wherein the client terminal is enabled to continue communicating with the virtual machine that has been migrated to the second server; and wherein, before completion of migration of the virtual machine, advertising notification of an address of the virtual machine is provided to the third network.

11. The system of virtual machine migration according to claim 10, wherein the first network is an IP network;

wherein each of the first node and the third node is provided with a network address translation function;

wherein, before migration of the virtual machine, a destination address of a packet destined for the virtual machine in transmission from the client terminal is subjected to a first translation in which an address of the virtual machine is translated into a second address by using the network address translation function of the third node; and wherein, at the first node, the destination address of the packet destined for the virtual machine in transmission from the client terminal is subjected to a translation from the second address into a first address, while a setting change in the third node is made so as not to perform the first translation, thereby accomplishing a changeover in routing for the communication between the virtual machine and the client terminal.

12. The system of virtual machine migration according to claim 10, wherein the first network is an IP network;

wherein each of the second node and the third node is provided with a network address translation function;

wherein, before migration of the virtual machine, a destination address of a packet destined for the virtual machine in transmission from the client terminal is transferred without translation through the third node and the first node; and wherein a setting change in the third node is made so as to perform the first translation in which the address of the virtual machine is translated into a second address, thereby accomplishing a changeover in routing for communication between the virtual machine and the client terminal.

13. The system of virtual machine migration according to claim 10, wherein the first network is an IP network;

wherein each of the first node, the second node, and the third node is provided with a network address translation function; and wherein, before and after migration of the virtual machine, the communication between the virtual machine and the client terminal is continued by controlling translation operation of the network address translation function.

14. The system of virtual machine migration according to claim 10,
    wherein the first network is a virtual network in which there are implemented first and second virtual networks, the first virtual network being connected to the third network but not being connected to the fourth network, and the second virtual network being connected to the fourth network but not being connected to the third network;
    wherein, before migration of the virtual machine, a packet destined for the virtual machine in transmission from the client terminal is transferred to the first virtual network through the third node; and
    wherein a setting change in the third node is made so that the packet destined for the virtual machine in transmission from the client terminal is transferred to the first virtual network through the third node, thereby accomplishing a changeover in routing for the communication between the virtual machine and the client terminal.

15. The system of virtual machine migration according to claim 10,
    wherein an address of the first node in the third network is made identical to an address of the second node in the fourth network.

16. The system of virtual machine migration according to claim 10,
    wherein a manager computer having a setting program is provided on the fourth network;
    wherein, at the time of migration of the virtual machine to the second server, the first server generates a packet associated therewith; and
    wherein, upon capture of the packet, the setting program carries out a setting change in the third node.

17. The system of virtual machine migration according to claim 10,
    wherein a manager computer having a setting program is provided on the fourth network;
    wherein, at the time of migration of the virtual machine to the second server, the second server generates a packet associated therewith; and
    wherein, upon capture of the packet, the setting program carries out a setting change in the third node.

18. The system of virtual machine migration according to claim 14,
    wherein, as an identifier of each virtual network, there is used a VLAN ID code, MAC address, MPLS label, tunnel additional information, or optical-path wavelength information; alternatively wherein, a communication line to be used is changed instead of attaching an identifier to each virtual network.

* * * * *